(12) United States Patent
Leisenberg

(10) Patent No.: US 6,436,335 B1
(45) Date of Patent: Aug. 20, 2002

(54) METHOD FOR CONTROLLING A CARBON BAKING FURNACE

(75) Inventor: Wolfgang Leisenberg, Bad Nauheim (DE)

(73) Assignee: Innovatherm Prof. Dr. Leisenberg GmbH & Co. KG, Butzbach (DE)

( * ) Notice: Subject to any disclaimer, the term of this patent is extended or adjusted under 35 U.S.C. 154(b) by 0 days.

(21) Appl. No.: 09/547,492

(22) Filed: Apr. 12, 2000

Related U.S. Application Data

(63) Continuation-in-part of application No. 09/138,168, filed on Aug. 21, 1998, now abandoned.

(30) Foreign Application Priority Data

Aug. 25, 1997 (DE) .......................................... 197 36 950
Jun. 19, 1998 (DE) .......................................... 198 27 361

(51) Int. Cl.[7] .............................................. C21B 13/00
(52) U.S. Cl. ............................ 266/44; 266/87; 266/99; 432/24
(58) Field of Search ............................ 266/44, 87, 99; 432/24

(56) References Cited

U.S. PATENT DOCUMENTS 4,354,828 A * 10/1982 Benton et al. ................ 432/24
4,859,175 A   8/1989 Dreyer et al.

FOREIGN PATENT DOCUMENTS

DE           280377 A     4/1990
WO          9119147       12/1991

* cited by examiner

Primary Examiner—Scott Kastler
(74) Attorney, Agent, or Firm—Pandiscio & Pandiscio

(57) ABSTRACT

A method for management of an anode furnace, from which an adjustable volume of flue gas is directed into a flue system, comprises the steps of measuring the actual flue gas temperatures in flues of each section as actual temperatures, taking related set temperatures from a set temperature schedule, calculating a time integral of deviation between actual and set temperatures, modifying the actual temperature during a baking process such that the time integral is reduced to zero at the end of the process, registering at least one of the oxygen content and the fuel load in each flue, and setting burner capacity according to the set temperature and to the available oxygen content in the flue.

7 Claims, 2 Drawing Sheets

METHOD FOR CONTROLLING A CARBON BAKING FURNACE

CROSS-REFERENCE TO RELATED APPLICATION

This is a continuation-in-part of application Ser. No. 09/138,168, filed Aug. 21, 1998 now abandoned the name of Wolfgang Leisenberg.

BACKGROUND OF THE INVENTION

1. Field of the Invention

This invention relates to a method for controlling a carbon baking furnace. The invention is particularly concerned with so-called ring furnaces, commonly used in baking carbon bodies to form the anodes for use in electrolytic production of aluminium.

2. Description of the Prior Art

The quality of the anodes seriously affects the cost of production of aluminium. Therefore, the baking process is, in terms of cost, one of the key concerns in aluminium production. Within the anode production process, the baking, which constitutes about 70% of the total cost, represents by far the most expensive stage. Except for capital costs, which are mainly caused by the furnace, all other costs, i.e. about 70%, are immediately affected by the firing and control system of the furnace. Depending on potline operating cost and anode cost, an economical balance has to be found between two opposing objectives.

High anode quality causes higher coke cost, shorter refractory lifetime, and higher energy cost, while low anode quality causes higher electrolysis cost. A specific combination of all parameters can be found, which leads to the lowest overall cost. This cost-minimum defines a specific anode quality. The task of the carbon plant is to produce this defined anode quality. The baking costs for coke, refractory and energy are effected by the average of anode quality. But for the electrolysis the average of the anode quality is not the only important parameter. If the portion of "bad" anodes exceeds a specific value, the whole electrolysis suffers. Therefore, the same portion of bad anodes can be achieved at a lower average of quality, i.e. at lower baking cost, if the consistency of the anode quality is increased.

The consistency is affected by the furnace design, the firing equipment, and the control philosophy. This invention is focused on an advanced control philosophy to increase the anode quality consistency and the flexibility in terms of a most efficient combustion.

The anode bake quality is defined by the heat treatment. Each anode has to be brought to a specific temperature for a specific time. More precisely, the quality of the anode is determined by the time during which the body is kept at a temperature above the sintering temperature. As a parameter to indicate the quality, a time integral of the temperature above this sintering temperature can be defined as the "baking index".

Ring furnaces have been used for many years in the baking of carbon anodes. These furnaces (FIG. 1) include a cooling zone 100 having five adjacent cooling sections 101, 102, 103, 104 and 105, a firing zone 200 having four adjacent firing sections 201, 202, 203 and 204, and a pre-heat zone 300 having three pre-heat sections 301, 302 and 303. Air at ambient temperature enters the furnace flue system through a cooling inlet, such as a manifold 1, and flows through the flues in a tortuous path as indicated by the curved arrows. Manifold 1 is shown at the entry of cooling section 105, but a further inlet may be provided at subsequent cooling sections in the fire direction. Firing frames 2, 3, 4 and 5 are provided for the infection of gaseous or liquid fuel into the firing sections. The flue gases leave the furnace through an exhaust outlet such as manifold 6. The general direction of forward movement of the flue gases is referred to as the direction of the fire and is indicated by arrow 10.

Green anodes initially charged into the furnace pits are progressively treated by changing the heating/cooling conditions by moving the exhaust manifold 6, the gas (or other fuel) injection firing frames 2, 3, 4, 5, and the cooling manifold 1 progressively in the "direction of fire" 10, as illustrated in FIG. 1. The draft within the flues is initially provided by air which enters through the cooling manifold 1. The cooling manifold 1 preferably injects air under positive pressure into the last cooling section 105 and the air flows forward either under its own positive pressure or because it is drawn forward by the negative pressure exerted by the exhaust manifold 6 at the other end of the active zone of the furnace. The draft through the flues is controlled so that there is negative pressure within the flues in at least the firing or baking sections 200 and in the preheat sections 300.

The air which initially enters is cold and has at least its normal oxygen content. The temperature of the cooling air increases as it moves through the cooling sections 100 towards the firing sections 200, due to heat transfer from the anodes in the adjacent pits, thus progressively cooling the baked anodes. The air reaching the firing sections 200 is thus elevated in temperature to such a degree that it will support the combustion of gaseous fuel injected into the firing sections 200 through the firing frames 2, 3, 4, 5 connected to each such section 204, 203, 202 and 201. If a liquid fuel is used, the temperature of the incoming air is such as to support both the combustion and vaporization of the fuel. The temperature of the flue walls in the latter firing sections 204 (that is the rearmost firing section in the direction of the fire) may be raised to approximately 1225° C. by combustion of the incoming fuel in the relatively high oxygen content incoming air in the second firing section 202, the oxygen content of the forwardly moving flue gases has been reduced and the temperature within the flue will also be lower than that in the third and fourth firing sections 203 and 204. The temperature and oxygen content of the flue gas falls further in the first firing section 201, so that the temperature of the flue gases leaving the first firing section 201 may have fallen to about 1000° C.

In the preheat sections 300 the temperature of the unfired anodes is progressively raised by the hot flue gases which have a relatively low oxygen content after much of the oxygen has been used in the combustion process of the firing sections 200. However, as the temperature of the unfired anodes is progressively raised, volatile materials in the pitch, which are used to bind the carbon material forming the anodes together, are released and burn in the residual oxygen of the flue gases. The temperatures of the flue walls in the first preheat section 301, where the unfired anodes are first subjected to the heated flue gases, may be in the range 200 to 500° C. In this first preheat section 301, all the heating of the unfired anodes takes place by extraction of the residual heat from the flue gases.

In the second preheat section 302, the temperature may rise to between 500 and 800° C., and the anodes are heated both by the incoming flue gases and the combustion of the pitch volatiles which are driven off as the anode temperatures are raised. In the third preheat section 303 of the illustrated embodiment, the flue wall temperature may reach 800 to 1000° C. due to the combined action of the incoming flue gases and the combustion of further pitch volatiles.

The flue gases are removed via the exhaust manifold 6 after passing through the flues of the first preheat section 301. The furnace section 401 preceding the first preheat section is packed with unfired anodes after the fired anodes from the previous pass of the fire have been unloaded from that section. The section 401 packed with unfired anodes then becomes the first preheat section when the manifolds and firing frames are next moved forward.

The condition of the flue gases in any active zone of the furnace can be controlled by adjustment of the amount of air supplied through the cooling manifold and extracted through the exhaust manifold, as well as by the amount of fuel gas injected into each firing section.

Each pit section is subjected in use to different heating conditions in order to bake green or unbaked carbon bodies into a desired anode material. The condition in each section is altered progressively between controlled limits until an upper limit is reached.

After a predetermined time, the major factors causing progressive alteration of the conditions in each section are moved to the adjacent downstream section. This type of movement takes place along the length of the furnace in which the carbon bodies are baked, and is referred to as fire move in the fire (downstream) direction. Thus, the carbon bodies do not move through the furnace but the furnace conditions are intermittently and progressively changed in each successive pit section so that any one section passes through a packing stage (not shown), to the several preheating stages 301, 302, 303 in which the temperature of the bodies is progressively increased, to several firing stages 201, 202, 203 and 204 in which the temperature of the bodies is progressively further increased, to several cooling stages 101, 102, 103, 104 and 105 in which the temperature of the bodies is progressively decreased, and finally to an unloading stage (not shown).

Any given section will have adjacent on one side a section which is being treated at the stage last followed by the given section, and on the other side a section which is being treated at the stage next to be followed by the given section. The successive sections under treatment together make up an active zone of the furnace and each furnace will normally have sufficient sections for at least two active zones, so-called fires to be operated at the same time.

The heating or cooling of the carbon bodies at the various stages is, as indicated above, brought about by heat transfer through the flue walls 1 from the gases 5 flowing through the flues 4. The flue gases are removed before a section in which the carbon bodies are initially packed into the furnace, so this section has no flow of gases through its adjacent flue walls. However, after this section, the carbon bodies are heated in the successive preheating stages 301, 302, 303 by flue gases which have passed through the firing stages 201, 202, 203 and 204. Following the preheating stages, the carbon bodies are baked by heat from the flue gases containing fuel gases which are burned to increase the temperature of the firing stages. After the firing stages 201–204, the carbon bodies are cooled in the successive cooling stages 101–105 by an incoming air flow which enters the flues at the final cooling stage 105.

In the preceding paragraph, the operation of the ring furnace has been described with reference to the treatment of the carbon bodies which are being baked in the furnace. However, as the carbon bodies are not themselves moved from section to section of the furnace, it is more conventional to consider the sections in relation to the air and fuel gas flows and the heat which is generated or removed in each section. When considered in this manner, the construction and operation of the furnace by movement in the fire direction can be seen to include a succession of preheat sections in which the green carbon bodies are progressively raised in temperature, a succession of firing or baking sections in which the temperature is progressively raised further, and a succession of cooling sections in which the temperature is progressively lowered. The flue gases move in the fire direction 10 from the cooling sections in at least the coldest of which cooling and combustion air enters the flues and moves towards the other end of the group of sections within which the action of heating, baking, and cooling the carbon bodies takes place. As the air which is the initial flue gas moves from the first cooling section, it is raised in temperature as it approaches the first firing section. In each successive firing section, fuel such as natural gas or fuel oil (hereinafter "fuel"), is injected into the flues where it burns in the incoming hot air stream.

As the fuel combustion proceeds, the oxygen content of the air stream is decreased and the temperature of the successive firing sections also decreases. After the last firing section, combustion continues in the flues with the burning of volatile materials, which are driven from the carbon bodies and the pitch used to bind them. These volatile materials (referred to as "volatiles") migrate through the flue walls to burn with the remaining oxygen in the air stream. In the last of the preheat sections, most of the residual heat is removed from the low oxygen air stream and serves to raise the temperature of the carbon bodies towards the temperature at which volatiles will be driven from them.

As the combustion of the fuel added to the furnace in the heating sections and of the volatiles driven from the carbon bodies in the preheat sections depends on the amount of oxygen available, control of the oxygen content of the gas stream drawn through the flues by the exhaust outlet is an important factor in maintaining the desired conditions throughout the furnace. The primary control over the draft is achieved by adjustment of the negative pressure (so called draft) exerted at the exhaust outlet. Increased draft draws more air into the flues and increases the amount of oxygen available over a given time at any point in the flue. However, the oxygen content of the flue gases is affected not only by the cooling and combustion air admitted at the end cooling section, but also by ambient air which may leak into the furnace due to imperfect sealing of various access apertures, such as inspection ports and fuel inlets, or through cracks in the furnace refractory.

In order to balance the numerous factors which affect the furnace operation and to make adjustments which will optimize both the furnace operation and the product quality, control systems have been devised which analyze data continuously or intermittently derived from observation of various furnace conditions. The analysis of the data is used to actuate appropriate control mechanisms which alter the furnace conditions towards predetermined optimum conditions.

Control systems are commonly computer operated. Various methods and apparatuses have been proposed to assist in the control of the furnace conditions and thereby produce the desired control over the quality of the baked products.

In International Patent Application PCT/FR87/00213 of Aluminium Pechiney, the gas flow rate in each flue is adjusted by the use of flap valves on each suction nozzle of the exhaust manifold. The flap valves are responsive to fluctuations in temperature and draft measurements in the flue and to capacity measurements made on the smoke from each flue.

In U.S. Pat. No. 4,354,828 assigned to South Wire Company and National Steel Corporation, the flue and pit temperatures are measured to produce a control signal which operates valves varying the air/fuel mixture of each burner in the baking stages of the furnace. This control mechanism is used to adjust the temperature in each flue for which the burner mixture is controlled.

In International Patent Application PCT/WO91/19147 a method for control of the oxygen/fuel ratio in a carbon baking furnace by obtaining the oxygen level in one section of the furnace by measurement or inference, and using this level to determine any changes in at least one of the flue gas flow rate, fuel injection level and air injection level, is described.

As referred earlier, a specific temperature vs. time profile in the flues surrounding the related anode pit is required in order to achieve a defined baking index. In the plants which are in service, a temperature vs. time schedule is specified giving the setpoints for the plant control units, following to the schedule as precisely as possible.

As shown in the description of the furnace operation, due to the amount of flue gas volume, bearing the oxygen, in relation to the total amount of fuel in the flue, consisting of the injected fuel in the fire sections and of the volatiles evaluated in the preheat sections, flooding situations occur, which prevent following precisely the temperature schedule. In addition, due to the fire move procedures, which last for more or less time, interruptions and deviations of the firing profile during the entire baking process are inevitable. But any deviation causes a permanent lack or excess of heat flow to the anode and so a dispersion of anode quality. Therefore, a fundamental limitation of the anode quality consistency is given with the conventional control philosophy, even with an accurate control system.

SUMMARY OF THE INVENTION

The above prior proposals are not entirely satisfactory and it is an object of the present invention to improve the control of carbon baking furnaces, thus leading to improved product quality and consistency.

Furthermore, in respect to an optimum operation of the furnace regarding fuel consumption and emissions of unburned volatiles, it is a further object of the invention to obtain the desired anode quality without having to follow a rigid temperature schedule at any time.

BRIEF DESCRIPTION OF THE DRAWINGS

Reference is made to the accompanying drawings in which is shown an illustrative embodiment of the invention, from which its novel features and advantages will be apparent.

In the drawings.

The basis of the invention is the fact that the instantaneous heat flow to the anode is determined by the temperature difference between anode pit and flue through which heated gases flow, and by the related thermal resistance between flue and pit. However, the final temperature of the anode, and so the quality, corresponds to the total heat flow over the entire baking time. So the final anode temperature is not determined by the instantaneous heat flow, but by the entire heat flow during the whole baking cycle. Therefore, the same anode quality can be achieved using different temperature profiles, as long as the overall heat flow remains the same.

Accordingly, as a first aspect of the invention, regarding this basic fact, one can define a firing index for each pit which represents the time-integral of the temperatures of the surrounding flues. The right firing index can be found easily, taking the actual temperature curves of the surrounding flues of a pit, where the anode quality equals the defined quality. By using this firing index as a reference index, one only has to look for deviations related to the reference index.

Figure 1:
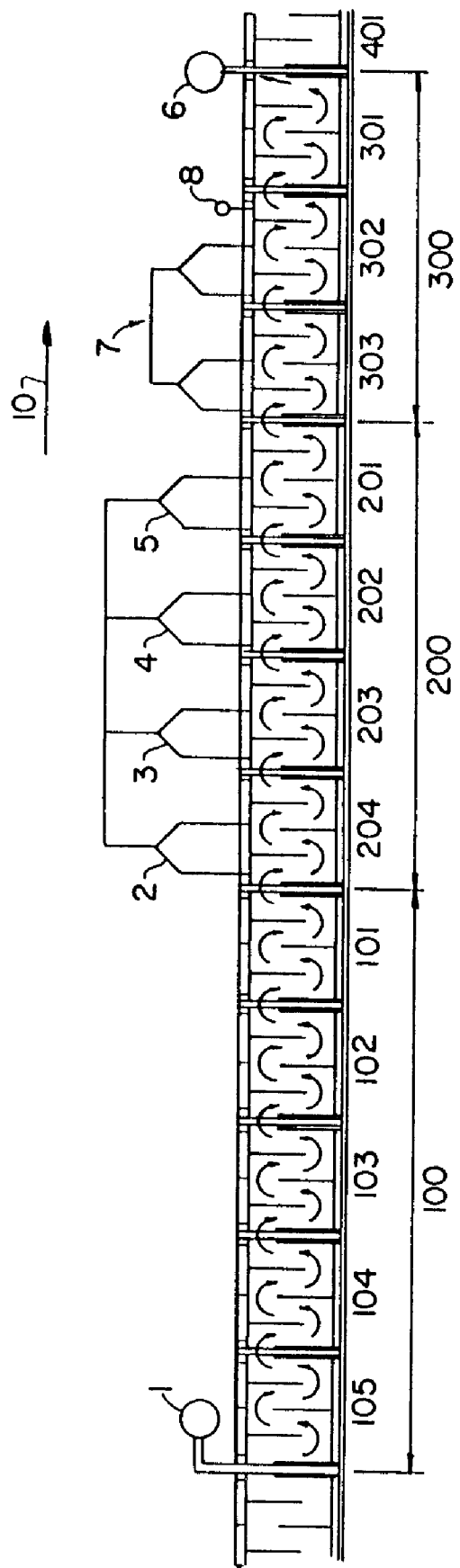
FIG. 1 is a diagrammatic sectional view of a known anode baking furnace.
Figure 2:
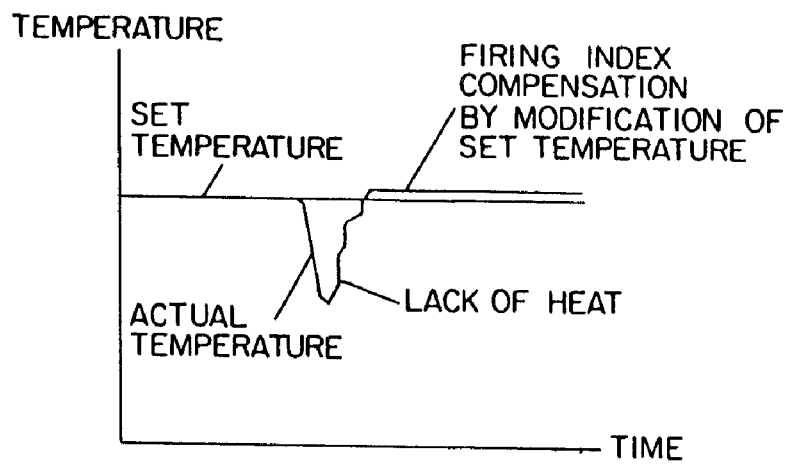
FIG. 2 is a graph illustrating heat flow compensation.

As discussed above, each deviation corresponds with a lack or excess of heat flow to the anode. Due to pitch burn disturbances, flooding situations, and fire move, the firing index varies and, consequently, the anode quality shows variations. With the deviation from the reference firing index, one has a tool which gives a figure for the lack or excess of heat flow to the anode. Referring to the fact that the firing index is given by a time-integral, one can derive two important facts which can be used for a control philosophy according to the invention: Deviations of the firing profile can be accepted as long as the firing index is kept constant. Deviations of the firing index can be corrected at a later stage of the process (FIG. 2).

The first application of the firing index is to compensate a lack or an excess of heat flow by automatic correction of the firing curve. A simple calculation shows that a period of time with low or overshooting temperature (failure, moving or pitch burn) can be corrected during the remaining time by changing the temperature schedule. This compensation can be calculated continuously, taking any deviation into account. To be able to calculate the firing index, the related steps in the control process are:

- to measure the actual flue gas temperatures in each section;
- to take the related set temperatures from the set temperature schedule;
- to calculate the time integral of the deviation between actual and set temperature; and
- to modify the actual temperature during the baking process in such a way, that the time integral is reduced to zero at the end of the process One of the most indefinable situations during the baking process is pitch volatile evolution. This situation can cause lack of oxygen in the preheat and firing area as well (flooding situation). The result is a bad use of the heat content of the pitch volatiles, a decrease in fuel efficiency at the burner ramps and an increase in unburned hydrocarbons in the flue gas.

The firing index compensation allows the control system to let float the actual temperature in the preheat sections 300 if pitch burn occurs. Therefore, the flue gas volume can be kept constant, or even increased at the start of pitch burn, ensuring ignition temperature for the volatiles and sufficient oxygen for burn out as well.

Since the preheating area 300 of the furnace is basically a convection heat exchanger, the temperature gradient in the preheating area is controlled by the flue gas volume Due to the fact that this gradient is not related to the oxygen demand for combustion, especially on furnaces with bad flue walls, a flooding situation in the firing zone can occur easily. Because there is insufficient combustion air at the burners, the fuel is not burned completely and the fuel efficiency, or even the temperature in the flue, drops. The reaction of a conventional firing control is to increase the fuel capacity.

The fuel efficiency then becomes even worse and finally, especially using natural gas, the unburned gas cools the flue further down.

Therefore, as a second aspect of the invention, based on the firing index, a flue gas/fuel management is necessary for an optimum furnace operation. For that management, a calculation or estimation of the oxygen situation in the flue is necessary. Derived from that calculation, the flue gas volume and/or the burner capacity in the fire sections can be adapted to the situation.

As next steps in the control process:
  the oxygen content in each flue or the fuel load has to be registered; and
  the burner capacity has to be set according to the set temperature and to the available oxygen content in the flue.

To calculate the fuel load of the individual flue, the sum of all burner capacities in this flue have to be summarized. This is no problem, because this information is available in a control system. As the second information, the volatiles coming from the pitch have to be taken into account. To solve this problem, the invention provides an indirect estimation of the volatile evaluating rate which does not need any additional equipment. As shown in FIG. 2, the pitch burn phase causes a peak in the temperature course due to the additional fuel which infiltrates into the flue. During this phase the evaluating rate correlates with the gradient of the flue temperature in the related section. Since this basic interdependence does not change, the temperature gradient can be used as a parameter to estimate the momentarily volatile evaluation and to calculate and convert this figure into an equivalent fuel capacity. So the total fuel load of each individual flue can be calculated at any time with no additional equipment nor additional handling during the fire move.

To estimate the oxygen situation in the flue, especially in the firing sections 200, International Patent Application PCT/WO91/19147 proposes a direct measurement of oxygen with oxygen probes. This method is not practicable because of the large number of probes which are necessary and due to the rough handling on baking furnaces, which would damage those sensitive instruments within a short time.

Since, due to the draft measurement in the preheat area, the actual figures for the pressure drop and the temperature profile along the flue is available in the control system (the pressure behind the last fire section is zero), the flue gas flow can be calculated for a given dynamic resistance of a flue and so the amount of free oxygen in the flue.

The problem is that due to the thermal stress of the flues during the lifetime of a furnace, the flow resistance changes continuously. Therefore, the calculation of the flue gas flow has to be adapted at least after each fire move for each individual flue. In International Patent Application PCT/WO91/19147 an experimental method is given to find the maximum fuel capacity for a given flue gas volume at the first fire section. This test method can be used for the flue gas flow calculation.

With the system according to the invention, the amount of fuel, which can be injected in the fire sections and the draft, which is necessary to provide sufficient oxygen for complete combustion of fuel and volatiles can be calculated and, if the draft cannot be increased to the needed extent, the burner capacity can be reduced for awhile, until the peak of the pitch burn volatiles evaluation has passed. The lack of heat transferred to the anodes can be compensated for at a later time using the firing index.

For the first approach of optimisation according to the invention using the firing index, the thermal resistance of flue walls 1 and packing material has been regarded as constant. But this is not exactly true, due to the thermal stress of the refractory and due to different loading situations of the anodes within the pit. A more precise figure for the anode quality is the temperature versus time profile to the anode itself. The baking index as the time integral of the temperature above the sintering temperature characterizes this heat treatment of the anode as a quality parameter. Therefore, a further improvement of the anode quality consistency is to monitor the anode temperatures of all pits.

At some furnaces, anode thermocouples are used to monitor a selection of anode temperatures. But they are not used for control, but only for indication. Since those thermocouples show a very short lifetime, only a few thermocouples are installed. Corrosion of thermocouples and/or protection tubes occurs in the fire sections at high temperatures. In the preheating sections, their lifetime is nearly infinite and cheap K-type couples can be used.

In order to get consistent anode temperature data of all pits without immense wearing cost for the anode thermocopules, according to the invention, a process model is used. Such models are known and presented, for example, by M. A. Thibault, R. T. Bui, A. Charette, E. Dernedde as "Mathematical Simulation of A Horizontal Flue Ring Furnace", Light Metals 1985, 1141–1151. Those process models are stationary and cannot be used for the present application. The dynamic model used for this invention is a model of the signal response, presented by F. Dildei, J. Kruger, W. Leisenberg: "Modellierung thermischer Prozesse zur Reglereinstellung und Sollwertvorgabe", Diploma Thesis, University of Applied Sciences, FH Frankfurt/Germany 1991.

Figure 3:
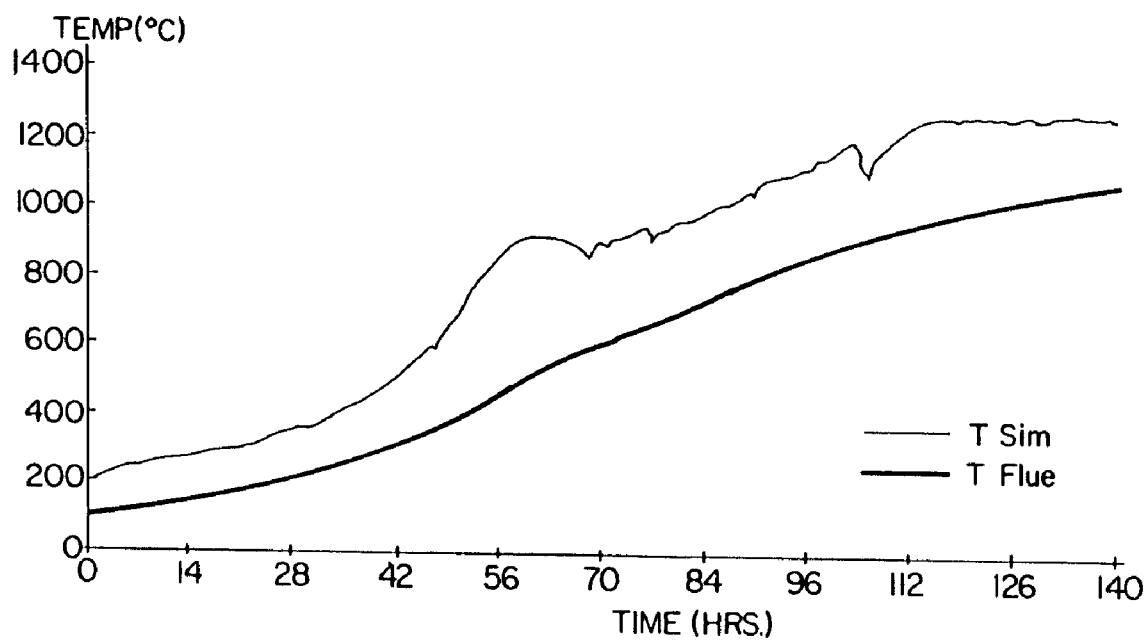
FIG. 3 is a graph showing the temperature profile of a baking process.

The essential point of the invention is the way of adaption of the model to the individual pit. The time between two fire moves responding for one fire advance lasts roughly 24 hours. So, in the preheat, 72 hours are available to adapt the model at anode temperatures below 600° C., where one can use cheap K-type thermocouples and protection tubes made from water pipes. FIG. 3 shows an example of the temperatures of the flue (Tflue), and of the simulation (Tsim). While the basic structure keeps being invariable, the parameters will be found during the time where the concerned pit performs the second and/or third section of the fire. Than the pit-thermocouples can be removed and used for the next pit. This method gives the opportunity to use a thermocouple for each pit but only in two or three sections of the preheat area. This time is long enough to identify the dynamic behavior of the flue-pit-system and to adapt a dynamic model.

With the adapted model, taking the actual temperature curves of the surrounding flues, the course of anode temperature, and the correlated baking index, can be calculated for each pit and for any flue situation. Using the same dynamic model for simulation, future reactions of the anode temperature and so the best correction of the set curve can be calculated, which brings the dispersion of the anode quality to a minimum.

With this adapted model it is also possible to achieve the desired anode quality at lowest possible top temperature which means with a minimum of energy and a maximum of refractory lifetime. The conclusion is, that with the model-calculated baking index the consistency of quality becomes even better and the anode thermocouple lifetime increases.

What is claimed is:
1. A method for controlling an anode furnace, from which an adjustable volume of flue gas is directed into a flue system comprising sections of flues, the method comprising the steps of:

measuring actual flue gas temperatures in the flues of each of the sections;

taking related set temperatures from a set temperature schedule;

calculating a firing index comprising the time integral of deviation between the actual and the set temperatures;

modifying the actual temperatures during a baking process such that the time integral is reduced to zero at the end of the baking process;

registering at least one of (i) the oxygen content and (ii) the fuel load in each flue; and setting burner capacity according to the set temperature and to the available oxygen content in the flue.

2. The method in accordance with claim 1, wherein free oxygen content in the flue is registered by calculating total burner capacity and volatile content in relation to flue gas volume.

3. The method in accordance with claim 1, wherein a temperature gradient in a pitch volatile evolution phase is determined in order to estimate a volatile evaluation rate.

4. The method in accordance with claim 1, wherein the burner capacity is reduced to an adjustable minimum when there is a lack of oxygen in the flue, and the burner capacity is increased during further baking as a function of available oxygen in such a way that by means of the firing index the heat flow to the anode is compensated.

5. The method in accordance with claim 1 and comprising the further steps of determining a baking index comprising the time integral of the anode temperature above a sintering temperature at each anode by means of temperature sensors in the anode pit, and determining a deviation integral from a specified temperature characteristic of the anode.

6. The method in accordance with claim 1, wherein individual temperature corrections to the setpoint temperature characteristics are optimized in such a way that a top firing temperature of all flues becomes a minimum.

7. The method in accordance with claim 5, wherein the measured temperature readings given by pit temperature sensors are used for adaption of a dynamic model of the temperature/time behavior of the flue-pit-system during a part of the preheating phase, which is used during a further firing process as an estimated actual anode temperature, without the need of temperature sensors on the anode and in the pit.

* * * * *